April 2, 1929.  S. M. J. ROOSA  1,707,878
HARVESTER FOR BEANS, PEAS, OR THE LIKE
Filed Nov. 28, 1927  6 Sheets-Sheet 1

INVENTOR.
Samuel M.J. Roosa
BY William W. Deane
his ATTORNEY.

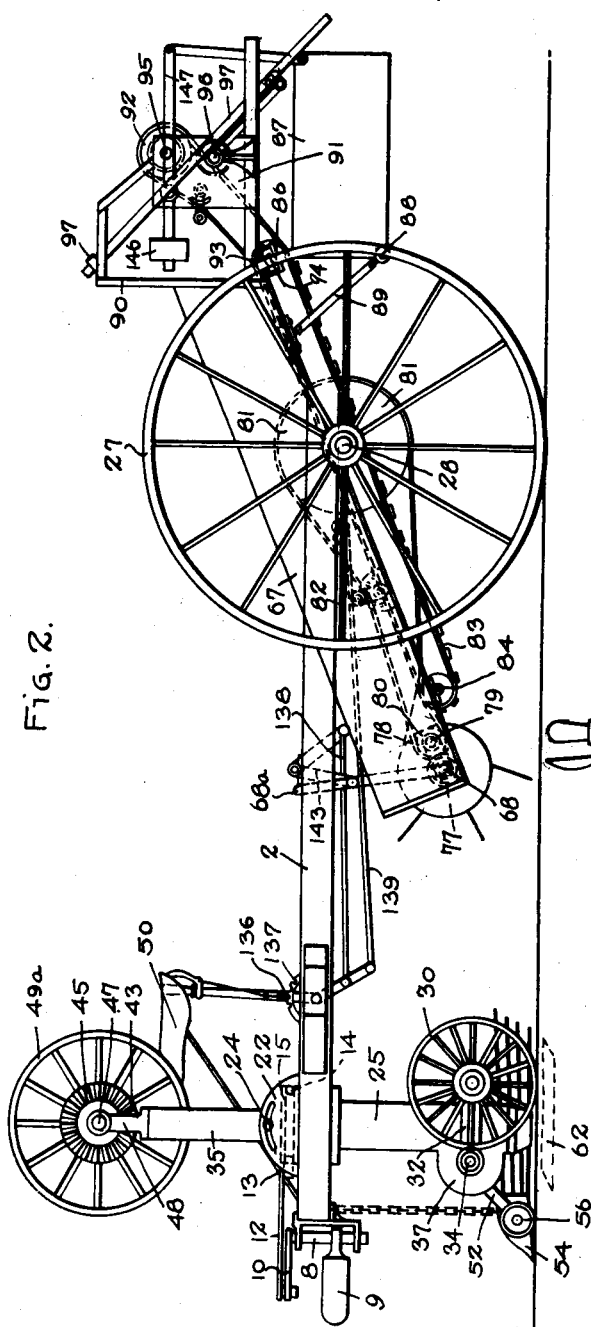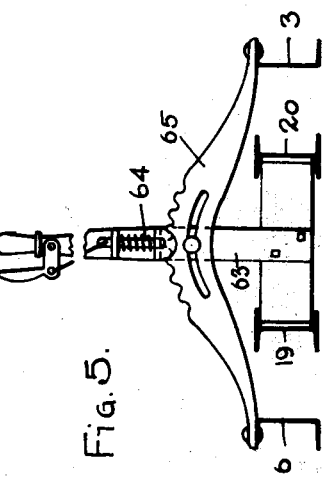

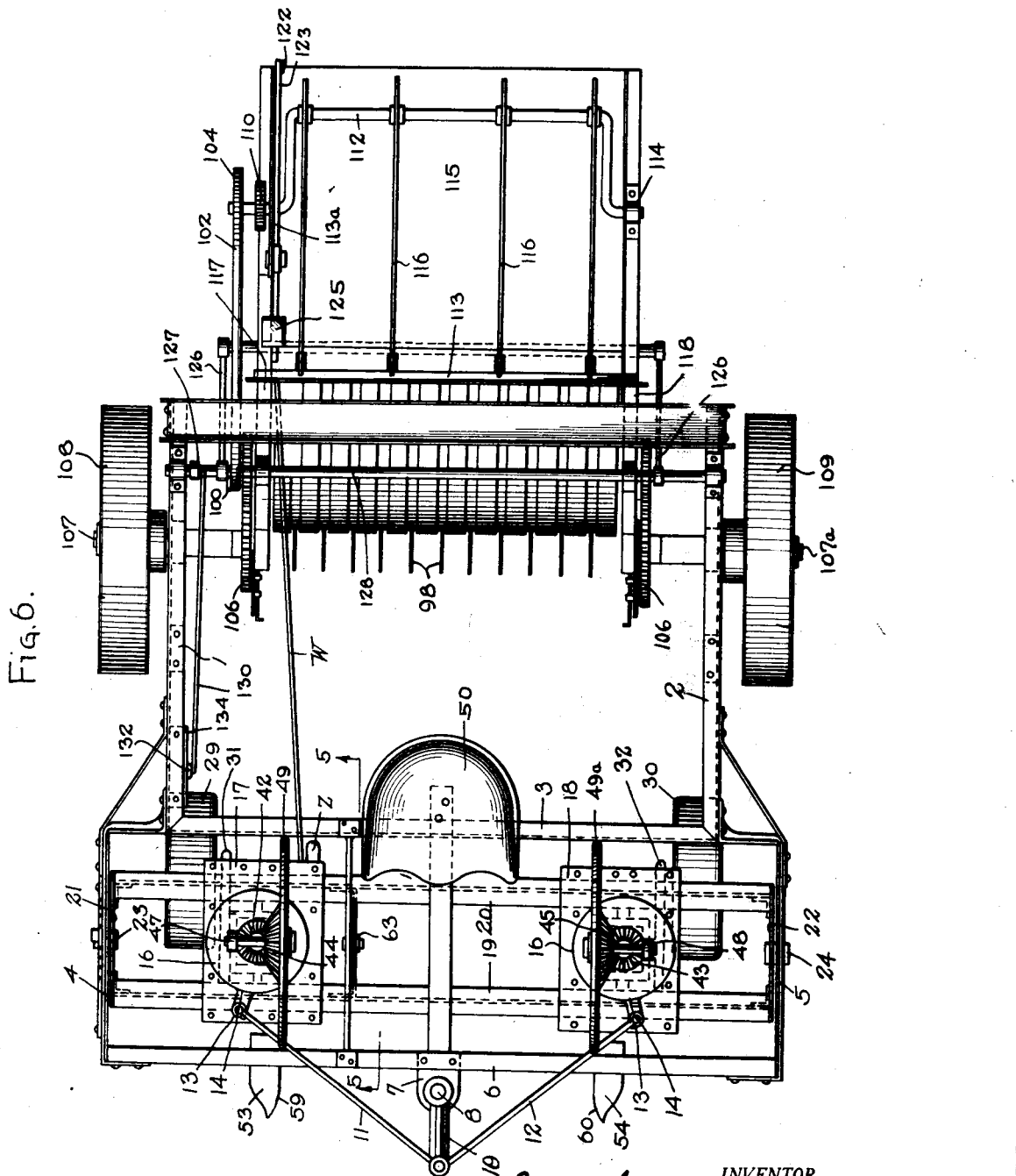

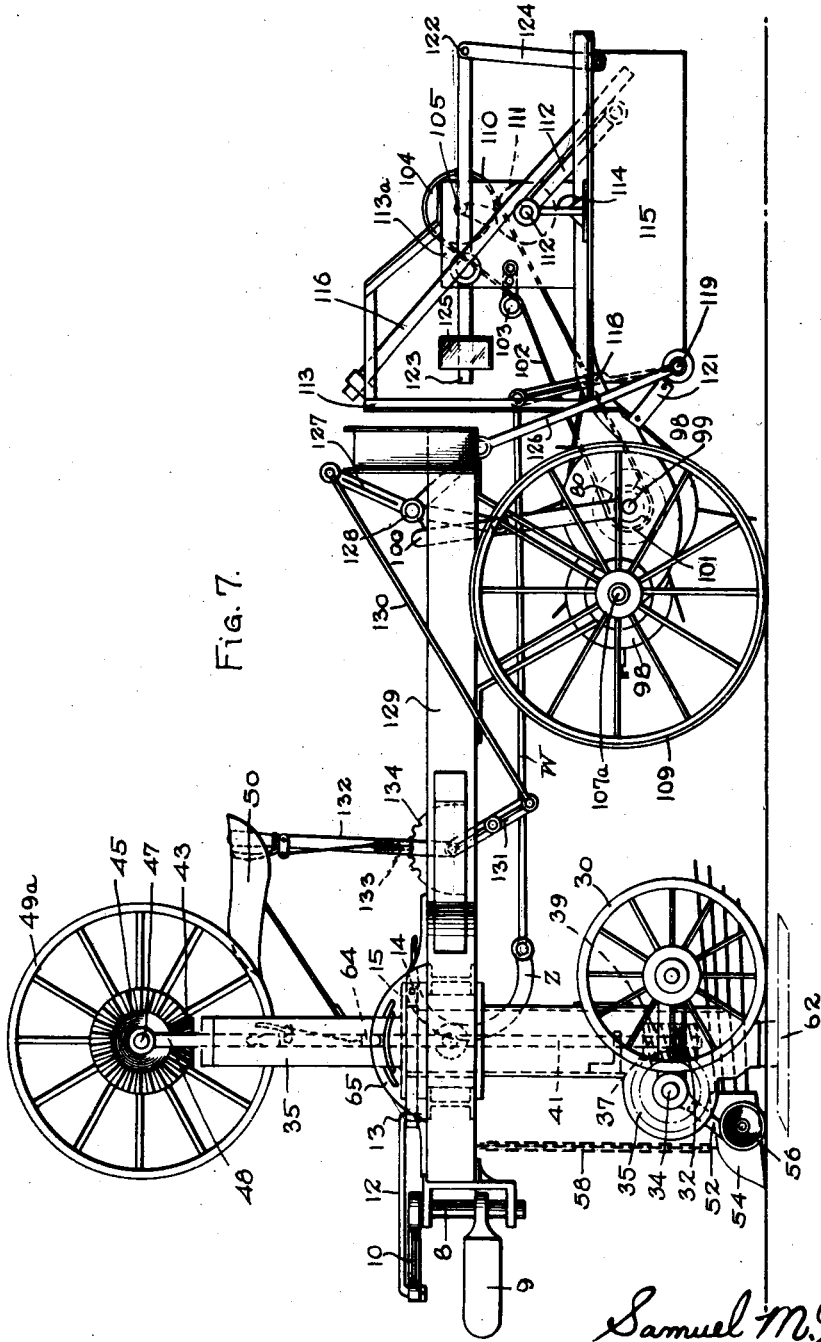

April 2, 1929.　　　　S. M. J. ROOSA　　　　1,707,878
HARVESTER FOR BEANS, PEAS, OR THE LIKE
Filed Nov. 28, 1927　　　　6 Sheets-Sheet 6

Inventor
Samuel M. J. Roosa,
By William W. Deane,
his Attorney

Patented Apr. 2, 1929.

1,707,878

UNITED STATES PATENT OFFICE.

SAMUEL M. J. ROOSA, OF OWOSSO, MICHIGAN.

HARVESTER FOR BEANS, PEAS, OR THE LIKE.

Application filed November 28, 1927. Serial No. 236,234.

My present invention has for its general object the production of a machine for the harvesting of beans, peas and the like which possesses all the advantages of the harvester for similar purposes as described and illustrated in Letters Patent of the United States issued to me March 15, 1921, and numbered 1,371,519, upon which this present invention is an improvement. The improvement comprises certain changes in the forms and arrangements of the parts of the machine and in newly invented additions thereto as fully illustrated in the accompanying drawings, of which—

Figure 2 is a side view of the parts illustrated in Figure 1.

Figure 5 is a vertical section through the front frame and tilting frame, taken on the broken line 5—5 of Figure 1, showing the lever and lever latching devices relating to the operation of the tilting frame.

Figure 6 is a plan view, showing all parts assembled, of a modification of this invention constructed without the conveyer, the pick-up devices delivering the bunches directly into the dumping pan.

Figure 7 is a side view of the parts of the modification set forth in Figure 5.

Throughout the drawings and description the same number is used to refer to the same part.

Figure 1:
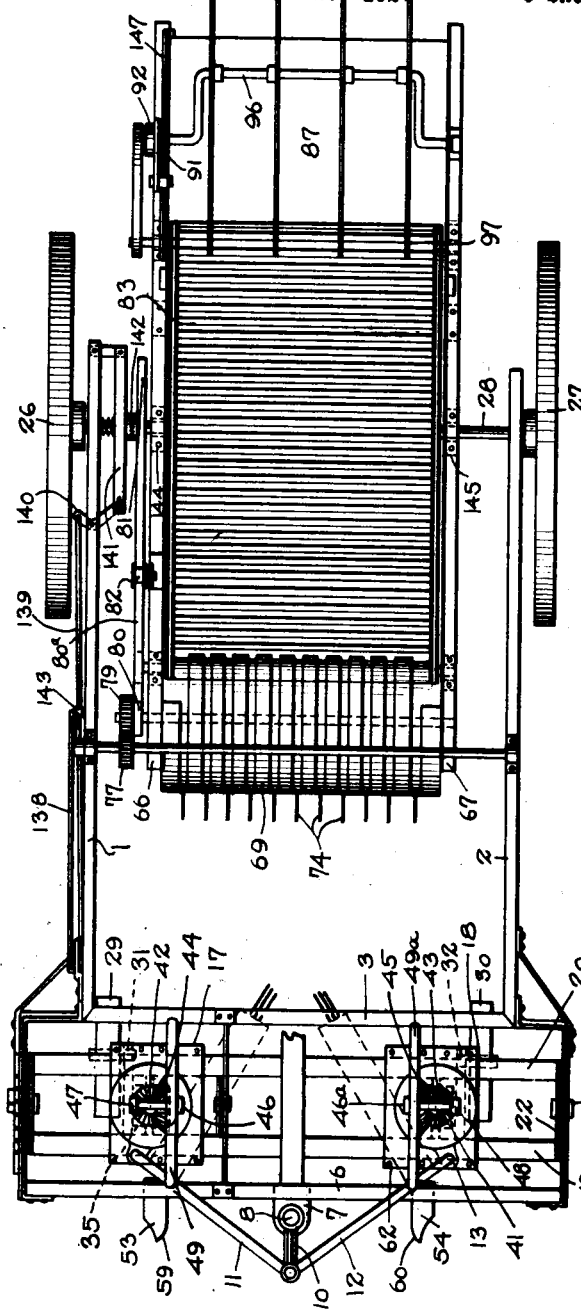
Figure 1 represents a plan view of all the parts assembled.
Figure 3:
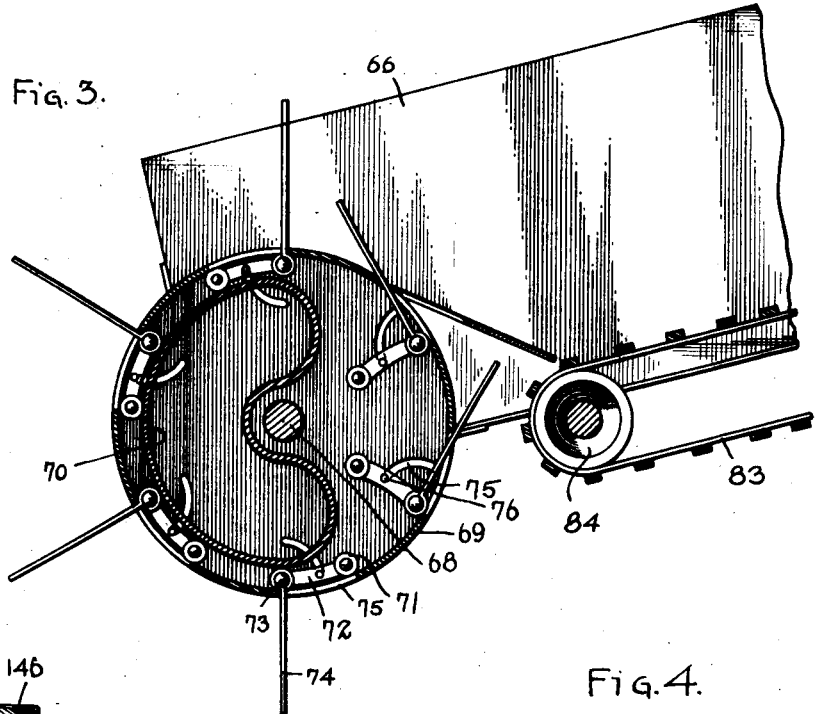
Figure 3 is a vertical sectional view through the pick-up devices and the cam by which they are actuated, showing the propinquity of the pick-up devices and the conveyer with respect to the dumping pan or container arranged at the rear to receive the bunched growths.
Figure 4:
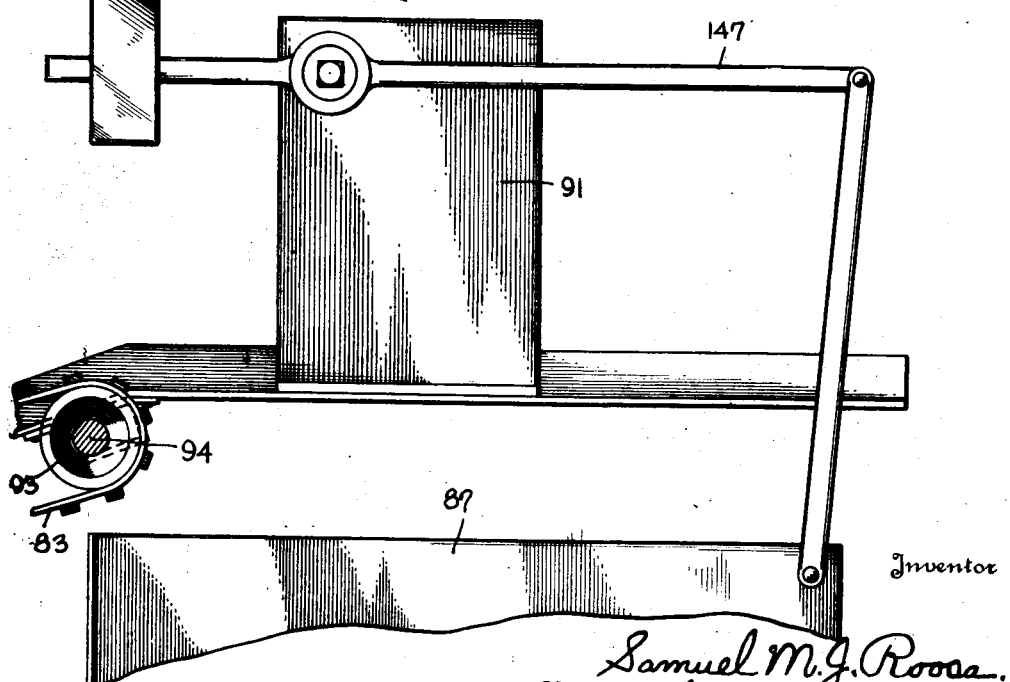
Figure 4 is a vertical sectional view of the rear end of the conveyer shown extending above the forward wall of the dumping pan, and illustrating the balancing lever and weight by which the pan is movably held in its bunch-receiving attitude.

Considering the drawings, Figures 1 to 5 inclusively, the side bars 1 and 2 constitute what may be termed the main frame of this invention. Those side bars are joined at their forward ends by a transverse beam 3 that forms the rear member of a front rectangular frame, the remaining bars of which are referred to by numbers 4 and 5 for the sides, and number 6 for the front or foremost transverse beam. The front beam 6 carries the coupling fork 7, which is engaged by the coupling pin 8 of usual construction, and provided with a tongue connection 9, suitable for attaching the harness of draught animals or the rear coupling bar of a tractor. At the top of the pin 8 is rigidly joined a crank arm 10 extending in a forwardly direction and pivotally secured to the meeting parts and at the juncture of the rods 11 and 12 shown in Figure 1 as located in a horizontal plane and inclined with respect to the longitudinal axis of the machine and diverging rearwardly. The rods 11 and 12 each has a limited sliding coupling 13 with a ring terminal 14 located in a horizontal circumferential groove 15 in a cylindrical, revoluble guide or retainer 16 extending upwardly through plates 17 and 18. Those plates may be adjustably secured to the transverse I-beams 19 and 20 which constitute the longer members of a transversely arranged tilting frame completed by the side or end members 21 and 22, and pivotally supported upon the side bars 4 and 5 of the rectangular front frame, described hereinabove, by pivot bolts 23 and 24. The purpose of the rearwardly diverging rods 11 and 12 is to simultaneously exert upon the retainers 16 any change of direction in the forward progress of the machine which would swing to either side the coupling pin 8 and its attached crank arm 10. It is desired that no sudden strain due to such change of direction shall be thrown upon the upright casing 25 which passes as illustrated through the retainer 16.

The ground wheels of this invention comprise the larger and power delivering wheels 26 and 27 on the transverse shaft 28 by which the pick-up and dumping devices are driven, and the front wheels of smaller size marked 29 and 30. Those smaller wheels are carried upon the ends of crank arms 31 and 32, the other and forward ends of the crank arms being secured to the transverse shafts 33 and 34 with which the upright casings 25 and 35 are provided. Shafts 33 and 34 are equipped with worm wheels such as 37, that mesh with worms like 39 on the vertical shafts 40 and 41 which extend upwardly within each of the upright casings. At the top the shafts 40 and 41 have beveled pinions 42 and 43 and those pinions engage larger bevel gear wheels 44 and 45 on the uppermost short shafts 46, 46ª, the bearings 47 and 48 of which are carried on the tops of the upright casings 25 and 35 as shown. Handwheels 49, 49ª are placed on shafts 46, 46ª at a convenient point within reach of the operator occupying the seat 50. Attached to each of the shorter shafts 33 and 34 and extending downwardly and forwardly are brackets 51 and 52 which are connected with the out-lying bunch-guiding devices 53 and 54, each having a roller 55, 56, in contact with the ground, and each having a vertical chain 57, 58, depending from the front frame and intended to maintain a certain distance between the frame and the bunch-guide or buncher. As best illustrated in Figure 1 the bunchers 53 and 54 are fashioned with curved edges or sides marked 59 and 60, and the office of the bunchers is to collect and direct the stalks of the plants in the path of this invention between and into contact with the knives or pullers diverging forwardly and designated 61 and 62. Each of the upright casings 25 and 35 carries at its lower end detachably secured one of the subsoil knives 61 and 62.

Mention was made hereinabove of the tilting frame which may rock upon the pivot bolts 23 and 24. To tilt the frame there is provided a lever 63 having a spring returned detent 64 movable into and out of engagement with the toothed arc 65, best shown in Figure 2. The operation of the parts thus far explained and described will be set forth in the statement of the complete action of this invention following the remaining portion of this specification.

The pick-up, conveyer and dumping pan or receiver elements of this invention are driven by the transverse wheel shaft or axle 28. Upon this shaft are carried the side barrier plates 66 and 67, in an inclined position as shown, and between the lower end of the side plates on a stationary transverse shaft 68 are the pick-up devices following substantially the construction shown in my Letters Patent aforesaid. The shaft 68 is carried at the lower end of a lever 68ª which will be again mentioned. The cam housing 69 covers the heart-shaped cam track 70, and to follow the track are rollers 71 upon the swinging ends of crank arms 72, the other ends of the arms being secured to the wrists 73 encircled and fastened to the coil spring ends of the pickers 74. The revoluble side of the housing 69 is pierced by a number of curved slots 75 adjacent to the spring ends of the pickers, and each crank arm has a pin, such as the pin 76 shown in Figure 3. The engagements of the pins 76 and the curved slots 75 serve to limit the play of the wrists and pickers. As will be noted, the cam track is secured to the stationary shaft 68, and the revoluble side of the cam housing is rotated by the gear 77 loose on shaft 68, but meshing with gear 78 revolving on stub shaft 79 projecting from the side plate 66 exteriorly and driven by the belt wheel 80 also on stub shaft 79, and by the belt 80ª leading to the driving belt wheel 81 on the wheel shaft 28. As usually constructed there is interposed a belt tightener device 82, best shown in Figure 2.

Between the inclined side plates 66 and 67 a conveyer 83 of any suitable construction is operatively borne upon the conveyer wheel or drum 84 adjacent to the picker devices, and extending over and operated by a like wheel or drum 85 on the main wheel shaft or axle 28. In Figure 2 it will be noted that the conveyer extends in an upwardly inclined direction beyond the axle 28 and its return end encircles the conveyer wheel or drum 86 arranged just over the edge of the dumping pan 87. The dumping pan 87, which may be of any desired size, has its lower corner towards the front of this invention provided with a pivotal connection 88 with a post 89 secured to the side plate 67, and it will be understood that the pan has its corresponding corner on the other side of the pan similarly supported.

Above the pan in Fig. 2 at the rear are a frame and side plate 90 and 91 to prevent the bunched growths from falling off sidewise during the operation. Frame and plate 90 and 91 are carried by the upper portions of the inclined side plates 66 and 67. On the outside of the side plate 91 is a band wheel or pulley 92 and a belt thereon passes in an inclined direction downwardly and around a pulley 93 on the end of shaft 94 which carries the conveyer drum 86. The wheel 92 drives the transverse shaft 95 extending from the side plate 91, and the shaft 95 carries a gear wheel arranged to drive a second gear on the end of a crank shaft 96, the crank portion of which swings around between the side walls and into the dumping pan 87. In its orbital path the crank shaft 96 encounters and raises and lowers the bars 97, of which there may be any number arranged in an inclined position as shown in Figure 2, and having their upper ends pivotally supported on the side wall 90. The function of the pivoted bars is to prevent the bunches as they are thrown into the dumping pan 87 by the conveyer from flying off towards the rear of the moving machine.

Figure 8:
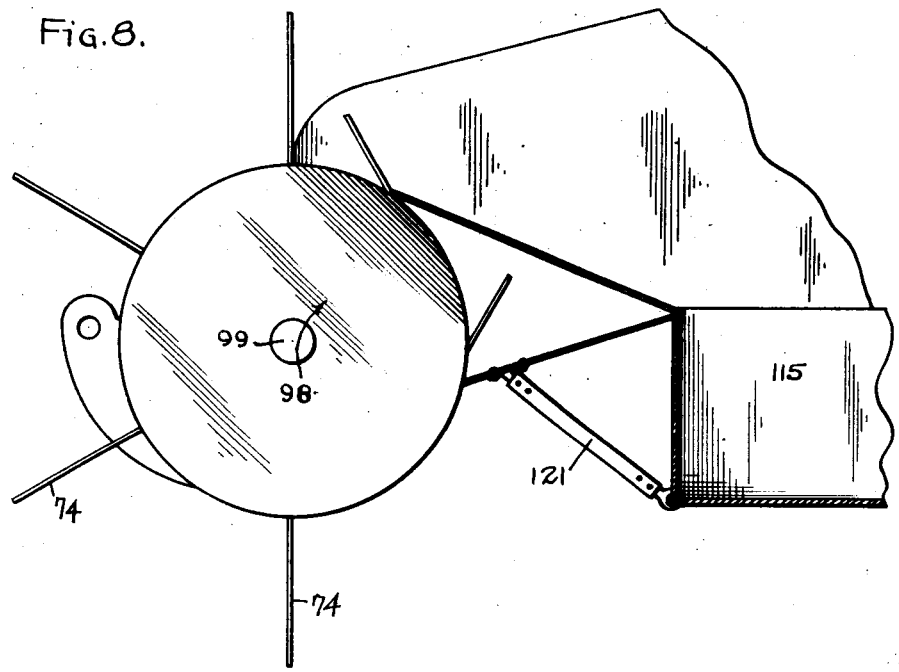
Figure 8 is a vertical sectional view through the pick-up devices employed with the modified form of this invention illustrated in Figures 6 and 7, and shows the manner of arranging the pick-up devices adjacent to the dumping pan.
Figure 9:
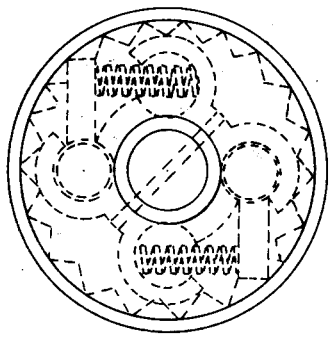
Figure 9 shows a vertical section of a modified form of hub for the main or larger ground wheels supporting the main frame, illustrating a ratchet construction permitting the wheel to operate reversely when the machine is moved backward, without disturbing the remaining working parts.

Next considering Figures 6, 7 and 8 illustrating the modified construction of this invention. That which may be termed the front or forward end of this modification is a reproduction part for part of the details connected with the front rectangular frame and relating to the bunching, digging or pulling devices, and it is not necessary to repeat the description thereof. The modified form differs solely in omission of the conveyer, and the necessary rearrangement of the members required for the operation without the conveyer member. The picker devices 98 are carried on the shaft 99 located at the lower end of the vertical lever 100, corresponding to the lever 68ª described in the foregoing explanation. The shaft 99 has the pulley 101 encircled by the driving belt 102 held taut by the belt tightener 103 and passing upwardly in an inclined direction to the belt wheel 104 on the projecting stub shaft 105 at the rear of the machine. The picker devices are driven by the gear wheel 106 on main wheel shafts 107 and 107ª at the ends of which are located the main supporting wheels 108 and 109. The shaft 105 which carries the belt wheel 104 has a gear 110 meshing with a gear 111 on a shaft 112 which extends across from one vertical side plate 113ª to a bearing 114, and between those supports the shaft takes a widened U-formation. As the shaft revolves the offset or U-portion sweeps the dumping pan 115, and raises and lowers the bunch guards or retaining rods 116, which have their upper ends pivotally attached to the upper forward corner of the side frame 113 as shown in Figure 7. The said parts are supported by side irons 117 and 118 extending in a downwardly and forwardly direction from the lower corner portion of the higher side frame 113, and engaging the axle 107 of the main wheels. The dumping pan 115 is supported at its lower forward corner by the pivotal junction 119 with the post brackets like 121 secured to the side irons 117 and 118. The weight of the dumping pan 115 is yieldingly supported by the rearward end 122 of a lever 123, the pan and lever being joined by the link rod 124. The lever is pivotally borne upon the side plate 113ª, and has an adjustable weight 125. To operate the dumping pan 115, an arm 126 is attached to the pivoted portion of the pan and extends upwardly and is pivotally and movably connected with the bell-crank lever 127 pivotally supported by bearings 128 on the side frame bar of the machine marked 129. A connecting rod 130 extends to the arm 131 of the hand lever 132 pivoted to the frame and having the spring returned detent 133 engaging the toothed quadrant 134. As the pan dumps, the widened U-portion of the shaft 112 sweeps the stalks out of the pan.

Again considering Figures 1 to 5 inclusively, the operation of this invention may be stated as follows:

On one of the side bars, in this case the side bar 1, a hand lever 135 is pivoted. The upper portion of the lever has a spring returned detent 136 engaging the toothed arc 137. The lower portion or arm of the lever has two connecting rods 138 and 139. The lower rod 139 as shown in Figure 1 extends to and rocks the crank 140 on the frame bar 1, thereby moving the clutch member 141, which has one side pivotally linked with the frame bar 1 as shown, and the other side connected with the crank 140. The clutch member 141 is splined on the axle or shaft 28 and engages in detachable relation a second clutch member 142 attached to the belt wheel 81 by which the picker devices are driven. The upper rod 138 from the hand lever 135 connects with a bell crank lever 143 pivotally carried on the frame bar 1 as shown in Figure 2. One arm of the bell-crank lever has a pivotal juncture with the upwardly extending lever 68ª previously mentioned, and when the hand lever 135 is drawn backward by the operator in the seat 50, the clutch members are released, and at the same time the lever 68ª is lifted bodily. By reason of the fact that the shaft 68ª engages the picker devices and also the side or barrier plates 66 and 67, the lower ends of the barrier plates are raised and those plates rock upon the axle 28 in their bearings 144 and 145, and the pan, already loaded enough to dump by reason of the accumulation of the bunches within it, becomes overbalanced and deposits the bunches in a pile upon the ground, assisted in so doing by the revolving crank or sweeper shaft 96 illustrated. As soon as the pan dumps the adjustable weight 146 on the lever 147 pivoted to the vertical side plate 90 returns the pan to its original attitude with respect to the attached parts. As the barrier plates 66 and 67 are raised at their lower ends causing the dumping of the pan 87, the picker devices are lifted and no plants are gathered or thrown into the pan, until the hand lever is released and permitted to move forward again, when the picker devices are lowered into operating position and the driving clutch members 141 and 142 are re-engaged. One purpose of extending the lever 68ª upwardly as illustrated in Figure 2, is to enable a person on the ground near the middle of the machine to raise the parts and dump the pan by hand if desired.

An operator occupying the seat 50, as set forth in Figure 2, may by rotating hand wheels 49, 49ª, on shafts 46, 46ª turn the vertical shafts 40 and 41 and worm devices with the result of exerting a lifting force on the smaller ground wheels 29 and 30 on the crank arms 31 and 32 and allowing the casings 25 and 35 to assume lower positions thereby sinking the subsoil knives or pullers 61 and 62. Or, the lever 63 may be so adjusted as to tilt the frame and, therefore, the upright casings 25 and 35 enough to bring the cutters to the ground surface.

The operation of the amended form of this invention is substantially the same as that given for the preferred form. The operation of the bell-crank lever 127 lifts the arm 126 which dumps the pan 115, and at the same time raises the lever 100 carrying the shaft 99 and the picker devices 98.

The foot lever Z of arcuate form connected by rod W with the arm 118 functions to hold the pan 115 from dropping, thus preventing a bunch of beans from falling on the head lands, or being disturbed by a driveway when moving through the field. Without the provision of said foot lever there would be a tendency of dropping bunches of beans from the pan while moving over a rough road or an uneven field.

Having now described this invention, and explained the mode of its operation, I claim:

1. In a harvester and buncher, the combination with a wheeled frame, of vertical casings spaced apart at the forward end of the frame and having vertical shafts, means for rotating said vertical shafts together, ground wheels for supporting the lower ends of the casings, means empowered by said shafts and acting upon said wheels for vertically moving the casings, and stalk bunching and pulling attachments carried by the lower ends of the said casings.

2. In a harvester and buncher, the combination with a wheeled frame, of vertical casings spaced apart at the forward end of the frame and having vertical shafts, means for rotatively holding the said casings in vertical position, means for rotating the said vertical shafts together, ground wheels for supporting the lower ends of the casings, means empowered by said shafts and acting upon said wheels for vertically moving the casings, and stalk bunching and pulling attachments carried by the lower ends of the said casings.

3. In a harvester and buncher, the combination with a wheeled frame, of vertical casings spaced apart at the forward end of the frame and having vertical shafts, means for rotating said vertical shafts together, ground wheels for supporting the lower ends of the said casings, the said wheels being carried upon a crank arm and at a distance from the lower end of the casing, means empowered by said vertical shafts and acting upon the said arms whereby said casings may be moved up or down, and stalk bunching and pulling attachments carried by the lower ends of the said casings.

4. In a harvester and buncher, the combination with a wheeled frame, of vertical casings spaced apart at the forward end of the frame and having vertical shafts, means for rotating the said vertical shafts together, means for rotatively holding the said casings in vertical positions, ground wheels for supporting the lower ends of the said casings, the said wheels being each carried upon a crank arm and at a distance from the lower ends of the casings, means empowered by the said vertical shafts and acting upon the said arms whereby the said casings may be moved up or down, and stalk bunching and pulling attachments carried by the lower ends of the said casings.

5. In a harvester and buncher, the combination with a wheeled frame, of vertical casings spaced apart at the forward end of the frame and having vertical shafts, means for rotating the vertical shafts together, means for tilting the said vertical casings together, ground wheels for supporting the lower ends of the casings, means acting upon the said wheels for vertically moving the casings, and stalk bunching and pulling attachments carried by the lower ends of the said casings.

6. In a harvester and buncher, the combination with a wheeled frame, of vertical casings spaced apart at the forward end of the frame and having vertical shafts, means for rotating the vertical shafts together, means for tilting the said vertical casings together, means for rotatively holding the said casings in vertical positions, ground wheels for supporting the lower ends of the casings, means acting upon the said wheels for vertically moving the casings, and stalk bunching and pulling attachments carried by the lower ends of the said casings.

7. In a harvester and buncher, the combination with a wheeled frame, of vertical casings spaced apart at the forward end of the frame and having vertical shafts, means for rotating the vertical shafts together, means for tilting the vertical casings together, ground wheels for supporting the lower ends of the said casings, the said wheels being each carried upon a crank arm and at a distance from the lower ends of the said casings, means empowered by the said vertical shafts and acting upon the said arms whereby the casings may be moved up or down, and stalk bunching and pulling attachments carried by the lower ends of the said casings.

8. In a harvester and buncher, the combination with a wheeled frame, of vertical casings spaced apart at the forward end of the frame and having vertical shafts, means for rotating the said shafts together, means for tilting the said vertical casings together, means for rotatively holding the said casings in vertical positions, ground wheels for supporting the lower ends of the said casings, the said wheels being each carried upon a crank arm and at a distance from the lower ends of the said casings, means empowered by the said vertical shafts and acting upon the said arms whereby the said casings may be moved up or down, and stalk bunching and pulling attachments carried by the lower ends of the said casings.

9. In a harvester and buncher, the combination with a wheeled frame, of vertical casings spaced apart at the forward end of the frame and having vertical shafts, means for rotatively holding the said casings in vertical positions, means for rotating the said vertical shafts together, ground wheels for supporting the lower ends of the said casings, means acting upon the said wheels for vertically moving the casings, a pivotal draught coupling, means actuated by the said coupling for exerting a rotating effect upon the said casings when the coupling is turned, and stalk bunching and pulling attachments carried by the lower ends of the said casings.

10. In a harvester and buncher, the combination with a wheeled frame, of vertical casings spaced apart at the forward end of the frame and having vertical shafts, means for rotatively holding the said casings in vertical positions, means for rotating the said vertical shafts together, means for tilting the said casings together, ground wheels for supporting the lower ends of the casings, means acting upon the said wheels for vertically moving the said casings, a pivotal draught coupling, means permitting the tilting of the casings and actuated by the movements of the said coupling for exerting a rotatory effect upon the said casings, and stalk bunching and pulling attachments carried by the lower ends of the said casings.

11. In a harvester and buncher, the combination with a wheeled frame, of bunching and pulling devices carried by the forward portion of the frame, a pick-up device, a conveyer having one end adjacent to said device, releasable means for operating the pick-up and conveyer connected with the wheels of said frame, pivoted side barrier plates constructed to carry said device and the end of the conveyer, a dumping pan served by and adjacent to the conveyer and carried by the said plates, and means for raising the ends of the barrier plates together with the said pick-up and conveyer and for dumping the said pan.

12. In a harvester and buncher, the combination with a wheeled frame, of bunching and pulling devices carried by the forward portion of the frame, a pick-up device, a conveyer having one end adjacent to said device, releasable means for operating the pick-up and conveyer connected with the wheels of said frame, pivoted side barrier plates constructed to carry said device and the end of the conveyer, a dumping pan served by and adjacent to the conveyer and carried by the said plates, means including a latched lever for raising the ends of the barrier plates together with the said pick-up and conveyer for dumping the pan, and hand-operated means arranged at a distance from the said latched lever whereby the said end of the barrier plates may be raised and the pan dumped.

13. In a harvester and buncher, the combination with a dumping pan, of means for dumping the pan, a shaft having an offset portion arranged to sweep the interior of the pan in its dumping position, and means for rotating the shaft.

14. In a harvester and buncher, the combination with a dumping pan, of means for operating the pan, bunch guards each having one end pivotally supported above the pan and extending into the pan, a shaft having an offset portion arranged to sweep the interior of the pan in its dumping position, the said portion of the said shaft acting to raise and lower the said bunch guards, and means for rotating the shaft.

15. In a harvester and buncher, the combination with a dumping pan, of means for dumping the pan, the said pan having an auxiliary dumping movement in addition to the movement of the said dumping means, and means provided with an adjustable weight for resetting the said pan after its said auxiliary dumping movement.

16. In a harvester and buncher, the combination with a dumping pan, of means for dumping the pan, and foot operated means for preventing at the will of the operator the dumping of the pan.

In testimony whereof I affix my signature

SAMUEL M. J. ROOSA.